United States Patent Office 3,546,580
Patented Dec. 8, 1970

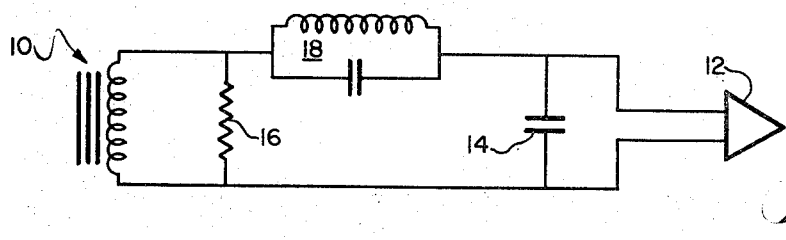
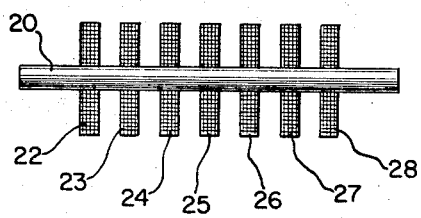
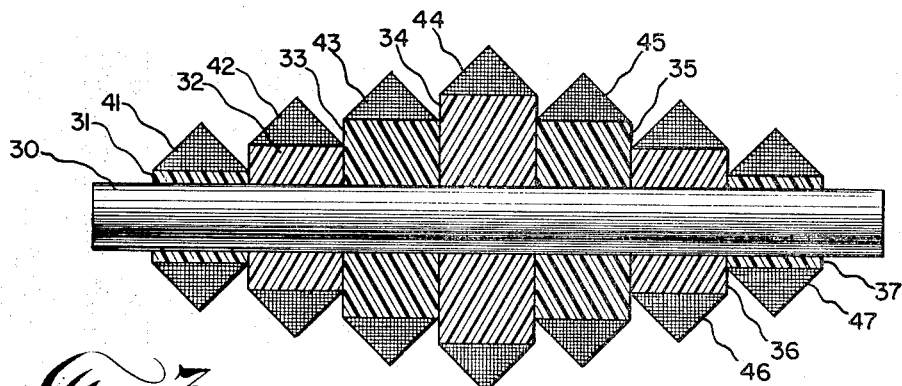
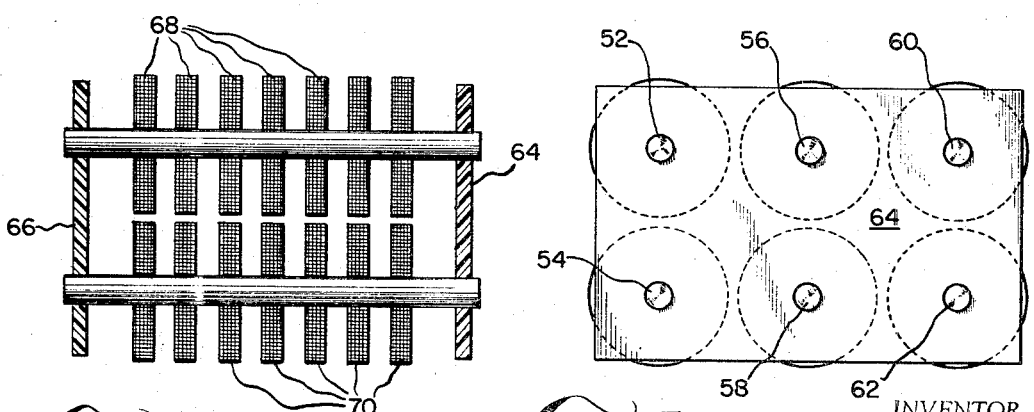
INVENTOR.
DONALD P. WILLIAMS

3,546,580
MAGNETIC FIELD VARIOMETER USING A LOW NOISE AMPLIFIER AND A COIL-CORE ARRANGEMENT OF MINIMUM WEIGHT AND MAXIMUM SENSITIVITY
Donald P. Williams, Los Angeles, Calif., assignor to North American Rockwell Corporation, a corporation of Delaware
Filed June 6, 1967, Ser. No. 643,873
Int. Cl. G01r 33/02
U.S. Cl. 324—47                                         16 Claims

ABSTRACT OF THE DISCLOSURE

A magnetic field variometer of extreme sensitivity with a relatively high resonant frequency that permits use of an extremely low noise amplifier. There is provided a sensor comprising a multi-layer coil or series of coils of a large number of windings having minimum weight and maximum sensitivity. These characteristics are achieved by an arrangement of a high permeability magnetic core having a weight substantially equal to the weight of the windings. Inductance of the windings and core is minimized by employing a number of series connected coil portions physically displaced from each other, either on the same core or on a number of mutually displaced parallel cores. Still further decrease in inductance of the extremely sensitive coils is achieved by a variable geometry winding having a substantially triangular cross-section and portions wound upon adjacent bobbins of successively different diameter.

BACKGROUND

For measurement of low level low frequency changes of the earth's magnetic field due to high altitude nuclear blast, for measurement of perturbations associated with solar flares and cosmic ray activity, and for measurement of magnetic changes of interest in magneto-telluric prospecting, it is necessary to sense relatively small variations in magnetic field, considerably less than one gamma peak to peak field changes occurring at frequencies less than 10 cycles per second, often as low as 0.01 cycle per second. For such applications a sensor comprising a multi-layer winding of many turns may be employed to provide high sensitivity. Such multi-layers multi-turn winding which may have thousands of turns, often as high as several hundred thousand turns, has an undesired high self inductance and, because of such high inductance, a relatively low self resonance frequency even though distributed capacitance may be relatively small. Further, the series resistance of the wire used for the many turns is relatively high because of extreme length of wire and the need to employ relatively small diameter wire to minimize weight of winding.

Extremely low noise amplifiers that may be employed at the relatively low frequencies of interest have a maximum source impedance that cannot be exceeded if the low noise characteristics of the amplifier are to be used to maximum advantage. Where the sensing element that provides the input to the amplifier has an impedance greater than this maximum value, the noise due to such input impedance may be significantly large as compared with the signal being measured whereby the sensitivity of the combined sensor and amplifier is severely compromised. Thus the sensor series resistance and impedance of the self inductance in the frequency band of interest cannot exceed the maximum impedance determined by the noise characteristic of the amplifier.

According to illustrated embodiments of the invention a high sensitivity low inductance magnetic field variometer is provided by a sensor having a large number of turns and a high permeability magnetic core means therefor with the inductance of the winding means decreased by displacing portions of the winding means from each other. The ratio of weight of winding to weight of core is in the range of 2 to 1 to 0.5 to 1 and several different geometrical configurations of winding or winding and core provide decreased inductance and increased resonant frequency of the sensor.

These and other objects and many attendant advantages of the invention will become apparent from the following description when taken in connection with the accompanying drawings wherein:

FIG. 1 illustrates a schematic circuit of a magnetic field variometer employing a sensor coil and amplifier, FIG. 2 illustrates one embodiment of the sensor of this invention, FIG. 3 illustrates an embodiment of the invention employing a modified geometrical configuration, FIG. 4 illustrates an embodiment employing parallel displaced cores, and FIG. 5 is an end view of the arrangement of FIG. 4.

Throughout the drawings like reference numerals refer to like parts. In accordance with this invention a magnetic field variometer that may be employed to detect extremely low level fluctuations of the earth's magnetic field, on the order of 1 cycle per second down to 0.01 cycle per second or considerably less will include, as illustrated in FIG. 1, a sensor 10 to be more particularly described hereinafter, connected to the input of a sensitive amplifier 12. For adjusting the resonance of the input circuit to a frequency above the frequencies of interest, such as for example above a frequency of 10 cycles per second, a capacitor 14 is provided across the amplifier input. A resistor 16 is connected across the sensor winding to provide damping of the tuned input circuit. A sensor of this type often used in the vicinity of 60 cycle power lines wherefor a 60 cycle rejector filter 1 is provided in the input circuit.

The variometer of FIG. 1 operates by virtue of Faraday's law of electromagnetic induction which states that a fluctuating magnetic field cutting across an electrical conductor will induce an electrical voltage therein. Accordingly, with the sensor 10 located in a fluctuating magnetic field, a voltage is induced in the winding which is provided as the input to the sensitive amplifier 12.

The open loop voltage induced in an induction coil according to Faraday's law of electromagnetic induction is stated by (1)  $\quad\quad e = -10^{-8} N d\phi/dt$ where $e$ is in volts when $d\phi/dt$ is in maxwells/sec. and $N$ is the number of turns. For ease in calculations and for design comparison of different types of sensors, it is convenient to work with a sensitivity or induced voltage $e$ that is due to a standard magnetic field variation of $1\gamma$ peak to peak and assuming that the magnetic field producing the $1\gamma$ peak to peak variation is varying sinusoidally at 1 cycle per second. For such a standard signal it may be shown that (2)  $\quad\quad e = 2\pi \times 10^{-13} N A \mu_e$ In Equation 2 $e$ is peak to peak voltage, $N$ is the number of turns, $A$ is the area of the winding in square centimeters and $\mu_e$ is the effective permeability of the core. Such effective permeability is equal to unity for air. The inductance $L_0$ of a coil without a core is given by (3)  $\quad\quad L_0 = \dfrac{4\pi \times 10^{-9} r^2 N^2}{l}$ This equation is theoretically correct for a long single layer solenoid. It may be modified for exact calculations to include a correction factor due to the relative short length of the solenoid and a second correction factor for the use of multiple layers.

The distributed capacity C of a many layer coil may be calculated closely as $$(5) \qquad C = \frac{0.6\pi r l k (T-1)}{dT^2}$$

Where C is in pico farads for dimensions in inches, T is the number of layers, $k$ is the dielectric constant of the insulation of the windings, $d$ is the separation between the layers and $r$ and $l$ the mean radius and length of the coil respectively.

For extremely low frequency work the distributed capacity of the coil can be neglected unless the number of turns is extremely large, on the order of one hundred thousand or more.

It will be appreciated that air core coils would apparently have two advantages as compared with coils having high permeability cores. First, high frequency response is more readily obtained with air core coils and second, effects of temperature and external magnetic fields on the permeability of the cores are non-existent. Nevertheless, if extreme sensitivities are desired an air core sensor would prove too heavy and would have too high a resistance for compatibility with a low noise amplifier.

Considering the weight problem, assume a requirement for a sensor of one meter diameter with a resistance of 1000 ohms and a sensitivity of 10 $\mu$v./$\gamma$/c.p.s. This sensitivity would require 2000 turns, a wire length of 20,000 feet, employing number 27 wire for the required resistance. Wire weight would be 12 pounds. Assuming use of such a sensor with an amplifier having an input noise level of 0.16 microvolt, a signal of 16 milligamma would generate in the sensor a voltage of $10 \times 0.016 = 0.16$ microvolt, giving a signal to noise ratio of unity. Still assuming an air core it will be seen from Equation 2 that double sensitivity, that is a sensitivity of 20 microvolts per gamma at 1 cycle per second, would require twice the number of turns. Nevertheless, with the additional constraint of a maximum resistance of 1000 ohms, number 24 wire size would be required with the wire weight per 1000 feet doubling. Accordingly, for twice the sensitivity the sensor weight would increase to 48 pounds, that is, the weight of the coil is substantially directly proportional to the square of the sensitivity for a fixed input resistance.

Further, from Equation 3 it is seen that the inductance of the coil will increase as the square of the number of turns. This too is undesired because increased inductance again is incompatible with the optimum low impedance requirements of the amplifier and furthermore the increased inductance significantly *lowers* the self resonance frequency of the sensor.

It has been found for an optimum sensor weight that both permeability and number of turns must be considered. For a desired extreme sensitivty at the very low frequencies of interest, the weight of core and coil should be substantially equal, that is, the ratio of the weight of the winding means to the weight of the core is preferably in the range of 2 to 1 to 0.5 to 1.

The impedance of the sensor coil includes a D.C. resistance and a series self inductance. As previously indicated resistance may be lowered by employing a larger wire size, but at the expense of significantly increased weight. Nonetheless, low inductance and high sensitivity are apparently incompatible, since the sensitivity increases as the number of turns and inductance increases as the square of the number of turns, presuming unity coupling between the windings. The required use of a high permeability core for low weight, high sensitivity applications, introduces a still further increase in inductance. Thus impedance of the sensor may be the prime limitation on sensitivity of the variometer.

According to a feature of this invention the self inductance of the high sensitivity multi-turn winding is significantly reduced by employing a unique winding geometry. As illustrated in FIG. 2 a high permeability core 20 of mu-metal or similar alloy is provided with a plurality of series connected windings 22 through 28, inclusive, each having substantially similar geometry and number of turns, and all windings being axially displaced from each other along the core 20. In this arrangement for reasons previously indicated, the total weight of wire and the windings is substantially equal to the weight of the core 20.

The arrangement of the windings illustrated in FIG. 2 provides a decreased self inductance for a given number of turns that is required for sensitivity. In order to provide more compact physical arrangement, while maintaining the high sensitivity and decreased inductance, the configuration illustrated in FIG. 3 is employed. In this embodiment a cylindrical core of mu-metal or similar alloy having the desirable high magnetic permeability is provided in the form of a rod 30 that may be, for a specific example, 0.75 inch in diameter and 18 inches in length. A plurality of bobbins 31 through 37 made of nonconductive and nonmagnetic material such as bakelite, phenolic or other plastic, is fixed on the core. On each bobbin is wound a number of layers of electrically conductive wire. The wire is wound to provide the illustrated triangular cross-section of the several windings 41 through 47 which are each substantially identical to each other except for diameter. For a sensor of high sensitivity requiring 40,000 turns, each of coils 41 through 47 was wound with 5,714 turns, making a total of substantially 40,000. The inside diameters of the coils follow the outside diameter of the bobbin which, for bobbins 31, 32, 33 and 34 are respectively 1.0775, 1.575, 2.005 and 2.575 inches, bobbins 35, 36 and 37 having diameters respectively equal to the diameters of bobbins 33, 32 and 31.

It has been found that triangular multi-layer coils of successively stepped diameter as illustrated in FIG. 3 provide a self inductance decreased by a factor of 5 as compared with the self inductance of a 40,000 turn similar winding wound as a single rectangular cross-section winding on a similar core with no change in coil diameter.

A core constructed as illustrated in FIG. 3 has the following characteristics:

Sensitivity, with mu-metal core—21 microvolts per gamma per cycle per second, 40,000 turns,
D.C. resistance—1800 ohms,
Self inductance with core—250 henrys,
Self inductance air core—10 henrys,
Sensitivity air core—0.79 microvolt per gamma per cycle per second,
Effective permeability of the core—280,
Resonant frequency-air core 6 kc. per second,
Resonant frequency with mu-metal core—400 hundred cycles per second,
Weight with core—about 5 pounds.

It may be noted that the self inductance of this sensor with a mu-metal core is some 25 times as great as that of a similar air core sensor. This relative small increase, considering the high permeability of the magnetic core is a substantial improvement as may be understood from Equation 4 which indicates that inductance would be expected to increase by a factor of 280, since the permeability of the core is 280. Thus it will be seen that the use of this unique geometry permits acceptance of the significant benefit of the core (e.g. decreasing winding weight and winding resistance by increased permeability) and at the same time significantly minimizing the increase in inductance that would be expected to be caused by the use of the high permeability core.

Magnetic induction sensors are highly directional and will measure only a component of a magnetic field variation along the axis of the sensor. Employing this principal it is possible to still further minimize inductance of a high sensitivity magnetic field variation sensor by employing coils having mutually parallel and mutually displaced parallel axes. Preferably, as indicated above, for purposes of minimizing weight each coil or set of windings is wound upon a high permeability magnetic core having a weight substantially equal to the weight of winding thereof. Such an arrangement is illustrated in FIGS. 4 and 5 wherein each of a plurality of substantially identical high permeability magnetic cores 52, 54, 56, 58, 60 and 62 are fixedly secured to each other by rigid non-magnetic end brackets 64 and 66. Each core has mounted thereon a plurality of substantially similar mutually axially spaced coils indicated generally at 68 and 70. It will be understood that all coils are connected in series to provide electrically a single winding of which the coils are physically displaced from each other both axially and radially. Thus, if a number of turns such as N turns are required on a given core for a desired sensitivity the inductance of the sensor will be some value L. If this inductance is $n$ times that which is compatible with a given amplifier, the inductance may be reduced to desired value by using $n$ identical cores with $N/n$ turns on each coil and connecting the coils in series so that the induced voltages from an external magnetic field change are additive. The coils and cores are arranged in parallel configuration in the earth's magnetic field having the axes of the coils and cores aligned with the direction of the field at that particular point.

As an example of the improvement derived from the arrangement of FIGS. 4 and 5, suppose that a mu-metal core of 0.5 by 24 inches with an effective permeability of 600 is to be used for a core and the desired sensitivity of the sensor is 50 microvolts per gamma per cycle. The total number of turns required is 100,000 and for number 27 wire, the total cross-section of the wire is 26 square inches and, with a winding length of 20 inches, the winding depth is 1.3 inches with a mean diameter of turns of 1.8 inches giving a wire length of 47,000 feet, a wire weight of 29 pounds and a resistance of 25,000 ohms. The inductance of this coil is 31 henrys and, with a core, is 18,600 henrys. The impedance of such a sensor is much too high for any standard low noise amplifier.

Employing the principles illustrated in connection with FIGS. 4 and 5, ten similar cores may be employed, each with 10,000 turns and each having a cross-sectional area of wire of 2.6 square inches. Thus the winding depth is 0.13 inch. Mean diameters of such coils are 0.63 inch and a total wire length is 17,000 feet. Such a sensor weighs 10.4 pounds as compared with 29 pounds and has a total resistance of 9,000 ohms. The inductance of each sub coil is 0.036 henry and the inductance of the total is 21.6 henrys. With the individual elements displaced so that there is negligible coupling between them, the ten elements in series have an inductance of 216 henrys. By using 25 elements and number 21 wire in the arrangement of FIGS. 4 and 5, the sensor would have a resistance of 2,000 ohms, an inductance of 85 henrys, and a wire weight of 40 pounds. Thus with presently available amplifiers, a minimum signal of 3 milligammas could be detected for a ten cycle bandwidth.

These examples are not necessarily considered to be optimum sensor designs but merely exemplary of the improvement that may be obtained employing the technique of FIGS. 4 and 5.

It will be readily appreciated that still further improvement may be obtained by employing the variable geometry configuration of FIG. 3 in a multiple spaced parallel core arrangement of FIG. 4. In such arrangement each of the core-winding combinations of FIG. 4 would be replaced by one core having a variable geometry multiple coil winding as illustrated in FIG. 3. A plurality of these would be mounted as indicated in FIGS. 4 and 5 thus taking advantage of the decreased inductance of both the variable geometry arrangement of FIG. 3 and the radial spacing of cores of FIG. 4.

Although the various embodiments described herein are particularly useful at extremely low frequencies, on the order of one cycle per second or less of magnetic field variation, the principles described are also applicable to effect improvement in exceedingly large induction type sensors that may be employed for detection of sferics in the very low frequency spectral region. Sferics, the short pulse electromagnetic radiation caused by lightning, may be studied by sensors having a derivative response up to over 100,000 cycles per second and having a sensitivity of 2 microvolts per hundred microvolts per meter of electric field strength at ten thousand cycles. If a minimum detectable signal of ten microvolts is assumed for a preamplifier, a field change of 500 microvolts per meter will be required. This is equivalent to a magnetic field change of $1.67 \times 10^{-8}$ to oersted. For this assumed requirement and employing a ferrite core of 0.5 inch diameter with an effective permeability of 100 the number of turns required to give a signal of ten microvolts at 10 kc. is 7500. With number 25 wire at 2500 turns per square inch the wire cross section is 3 square inches. With a 10 inch winding length the wire depth is 0.3 inch for 15 layers and length required is 1570 feet. The wire weight is 1.5 pounds and has a total resistance of 52 ohms. The inductance of the element is 0.0288 henry without the core and 2.8 henrys with the core. It may be shown that the effective capacitance of such a sensor is 76 $\mu\mu$f. and the self resonant frequency is 11 kc. For many applications such a resonant frequency is much too low to be of use. Such a resonant frequency may be increased by greatly increasing the size of the coil, and spacing the windings to provide an air core sensor having a size of about 6′ x 6′ x 2′.

For the above application, a sensor of much smaller size with the same sensitivity may be constructed by employing the principles illustrated in FIGS. 4 and 5. Five similar cores may be used, each with 1500 turns and a coil length of two inches wound to the same depth as before. With such an arrangement the total inductance is 0.36 henry, capacitance is 15.2 $\mu\mu$f. and the resonant frequency is 67 kc., well with the range of useful frequencies of such sensor. Thus it will be seen that the use of mutually displaced parallel cores allows a decrease inductance with no concomitant loss in sensitivity.

There have been described a number of embodiments of a sensor for a magnetic field variation having extreme sensitivity, relative low weight and low impedance all to provide a minimum size, maximum sensitivity sensor most compatible with highly sensitive low noise amplifiers.

What is claimed is:

1. A magnetic field variometer for sensing low level, low frequency magnetic field variations comprising:
   a low noise amplifier having a maximum input impedance determined by the noise characterisics of the amplifier;
   core means having high magnetic permeability;
   coil means coupled to the amplifier input having a plurality of turns wound on said core means, said coil means having a D.C. resistance and impedance of self inductance in the frequency band of interest not greater than said maximum input impedance,
   the ratio of the weight of said coil means to the weight of said core means being in the range of 2:1 to 0.5:1, and said coil means and core means being arranged relative to one another to decrease the self inductance of said coil means from its normal solenoidal self inductance to conform to the amplifier impedance requirements.

2. The variometer of claim 1 wherein the coil-core arrangement for decreasing self inductance comprises the separation of the coil means into a plurality of coils wound on said core means and displaced from each other along the core to decrease the flux linkage therebetween.

3. The variometer of claim 1 wherein the coil-core arrangement decreasing self inductance comprises arrangement of said core means as a plurality of cores having mutually spaced parallel axes, said means being arranged as a plurality of coils, each being wound upon a respective one of said cores and being connected in series.

4. The variometer of claim 3 wherein each of said cores is substantially similar to each other core and each coil is substantially similar to each other coil.

5. The variometer of claim 2 wherein each said coil comprises a multi-layer winding having an internal diameter different than the internal diameter of an adjacent coil.

6. The variometer of claim 2 wherein each said comprises a multi-layer winding having a substantially triangular cross-section.

7. The variometer of claim 3 wherein each coil on each core is divided into a number of mutually displaced multi-layer coil portions.

8. A high sensitivity low inductance magnetic field variometer for detecting low level, low frequency magnetic field change comprising:
   a low noise amplifier having a maximum input impedance determined by the noise characteristics of the amplifier;
   multi-turn winding means coupled to the input of the amplifier said winding means having a D.C. resistance and impedance of self inductance, in the frequency band of interest, not greater than said maximum input impedance and high permeability magnetic core means therefor, the ratio of weight of said winding means to weight of said core being in the range of 2:1 to 0.5:1; said winding means and core means being arranged relative to one another to decrease the self inductance of said winding means from its normal solenoidal self inductance to conform to the amplifier impedance requirements, said arrangement comprising maintaining at least one portion of said winding means displaced along the core from other portions thereof.

9. The variometer of claim 8 wherein said winding means has at least 20,000 turns.

10. The variometer of claim 9 wherein said winding means has a D.C. resistance not greater than 10,000 ohms.

11. The variometer of claim 8 wherein said winding means has a number of turns and the core means has a permeability sufficient to provide a sensitivity of at least 30 microvolts in a one cycle per second field of one gamma peak to peak variation.

12. The variometer of claim 11 wherein said winding and core means have an inductance of less than 300 henrys.

13. The variometer of claim 8 wherein the weight of said winding means is substantially equal to the weight of said core means.

14. The variometer of claim 8 wherein said winding core arrangement includes the use of a plurality of coils displaced from one another along the core each comprising a multilayer winding of different diameters, whereby self-inductance of the coil means is substantially decreased.

15. The variometer of claim 14 wherein each said coil has an internal diameter different than the internal diameter of the adjacent coil.

16. The variometer of claim 14 wherein the coils are displaced from each other both axially and radially along the core.

References Cited

UNITED STATES PATENTS

| | | | |
|---|---|---|---|
| 1,813,857 | 7/1931 | Kubler | 336—225 |
| 2,436,394 | 2/1948 | Maltby et al. | 324—43 |
| 2,462,884 | 3/1949 | Miller | 336—231 |
| 2,931,974 | 4/1960 | McLaughlin et al. | 324—43 |
| 2,964,700 | 12/1960 | Lee | 324—43 |
| 3,085,197 | 4/1963 | Hings | 324—43 |
| 3,149,278 | 9/1964 | Cartier et al. | 324—8 |
| 3,234,491 | 2/1966 | Baur | 336—225 |

FOREIGN PATENTS

| | | | |
|---|---|---|---|
| 254,616 | 1/1963 | Australia | 336—225 |
| 318,110 | 11/1930 | Great Britain | 336—225 |
| 464,880 | 5/1950 | Canada | 340—386 |

RUDOLPH V. ROLINEC, Primary Examiner

R. J. CORCORAN, Assistant Examiner

U.S. Cl. X.R.

324—8; 102—18; 336—180, 225